(12) United States Patent
Kelly et al.

(10) Patent No.: US 10,740,252 B2
(45) Date of Patent: Aug. 11, 2020

(54) SERIAL PERIPHERAL INTERFACE FILTER FOR PROCESSOR SECURITY

(71) Applicant: MICROSOFT TECHNOLOGY LICENSING, LLC, Redmond, WA (US)

(72) Inventors: Bryan David Kelly, Carnation, WA (US); Christopher Lawrence Weimer, Redmond, WA (US); Mark Andrew Shaw, Sammamish, WA (US); Priya Raghu, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/958,122

(22) Filed: Apr. 20, 2018

(65) Prior Publication Data
US 2019/0324923 A1 Oct. 24, 2019

(51) Int. Cl.
| | | |
|---|---|---|
| G06F 12/00 | (2006.01) | |
| G06F 12/14 | (2006.01) | |
| G06F 13/10 | (2006.01) | |
| G06F 13/40 | (2006.01) | |
| G06F 13/24 | (2006.01) | |

(52) U.S. Cl.
CPC ............ G06F 12/14 (2013.01); G06F 13/102 (2013.01); G06F 13/24 (2013.01); G06F 13/4004 (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 5,448,744 A * | 9/1995 | Eifert | .................... | G06F 9/3877 712/40 |
| 2004/0128431 A1* | 7/2004 | Liu | ..................... | G06F 13/4291 711/103 |

* cited by examiner

*Primary Examiner* — Jason W Blust
(74) *Attorney, Agent, or Firm* — Newport IP, LLC; Scott Y. Shigeta

(57) ABSTRACT

A processor may be coupled to a flash memory by way of an interface. The processor may be caused to read and/or write data, such as computer executable instructions, from/to the flash memory via the interface. An interface filter may be interposed between the processor and the flash memory to enhance the security and validity of data transactions associated with the processor and the flash memory.

19 Claims, 11 Drawing Sheets

SERIAL PERIPHERAL INTERFACE FILTER FOR PROCESSOR SECURITY

BACKGROUND

Computer hardware platforms typically include several components which execute dedicated firmware to provide initialization and low-level runtime control thereof. These components may include not only one or more central processing units (CPUs), but also peripheral components mounted on the motherboard and/or on attached peripheral cards.

Dedicated firmware may be stored in memory associated with the computer hardware platforms. Such memory may be random access memory (RAM), dynamic random-access memory (DRAM), static random-access memory (SRAM), read only memory (ROM), programmable read only memory (PROM), electrically programmable read only memory (E-PROM), electrically erasable programmable read only memory (EEPROM), or flash memory.

An interface may be used by CPUs and other peripherals to allow access to the firmware and other executable instructions and data stored in the memory associated with the computer hardware platforms. For example, the interface may be a serial peripheral interface (SPI) that provides an asynchronous serial data link between a CPU (e.g., master device) and the memory (e.g., slave device).

Firmware security is integral to maintaining the integrity of computer hardware platforms. Firmware attack vectors include host/driver access, network access, power-on and reset, boot and pre-boot, and virtual machine access. Server platforms within modern data centers present additional surfaces for firmware attacks, by allowing third-party applications and operating systems to provision bare metal, and by allowing guest Virtual Machines physical access to a variety of hardware resources (e.g., CPUs, GPUs, FPGAs, memory and/or SSDs).

It can be appreciated that there is an ongoing need to enhance the security and integrity of computer hardware platforms. Specifically, operators of server platforms within modern data centers desire to enhance the security and integrity of firmware and other computer executable instructions stored in memory accessed by hardware resources associated with modern data centers.

SUMMARY

The disclosed techniques provide robust security for computer hardware platforms that implement hardware resources (e.g., processors) that interface with storage resources (e.g., flash memory). A processor may be coupled to a flash memory by way of an interface. The processor may be caused to read and/or write data, such as computer executable instructions, from/to the flash memory via the interface. An interface filter may be interposed between the processor and the flash memory to enhance the security and validity of data transactions associated with the processor and the flash memory.

In some implementations, the interface filter analyzes instructions sent by the processor to the flash memory. Instructions understood by the interface filter to be a security threat to the processor and/or flash memory may be terminated by the interface filter. Partial or incomplete instructions may be received by the flash memory after intervention by the interface filter. Such partial or incomplete instructions may be disregarded by the flash memory. Therefore, the interface filter functions to terminate instructions that may be a security threat to the processor and/or flash memory before the instructions are able to cause harm to the hardware platform and associated peripherals incorporating the processor and the flash memory.

In some implementations, a central processing unit (CPU) is coupled to a flash memory via a serial peripheral interface (SPI). An SPI filter, which may be a type of processing device, is interposed between the CPU and the flash memory. The SPI filter is functional to analyze instructions generated by the CPU and provided to the flash memory. The instructions may include read or write instructions that comprise at least one command, addressing and data.

The SPI filter may analyze the instructions to determine if the at least one command, addressing and/or data may pose a security threat to the CPU and/or flash memory. For example, the SPI filter may determine that the at least one command indicates a data write to an address location of the flash memory that is read only. The SPI filter may respond to the security threat posed by the instructions by causing an early transition of a chip select (CS) signal or slave select (SS) signal. This early transition of the CS signal or SS signal will corrupt the instructions determined by the SPI filter to be malicious. While the corrupted instructions may be received by the flash memory, the flash memory simply discards the corrupted instructions. Specifically, the flash memory is functional to discard unreadable instructions caused by transmission errors and the like. The flash memory simply deems the corrupted instructions as being unreadable instructions.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The disclosed techniques provide robust security for computer hardware platforms that implement hardware resources (e.g., processors) that interface with storage resources (e.g., flash memory). A processor may be coupled to a flash memory by way of an interface. The processor may be caused to read and/or write data, such as computer executable instructions, from/to the flash memory via the interface. An interface filter may be interposed between the processor and the flash memory to enhance the security and validity of data transactions associated with the processor and the flash memory.

In some implementations, the interface filter analyzes instructions sent by the processor to the flash memory. Instructions believed by the interface filter to be a security threat to the processor and/or flash memory may be terminated by the interface filter. Partial or incomplete instructions may be received by the flash memory after intervention by the interface filter. Such partial or incomplete instructions may be disregarded by the flash memory. Therefore, the interface filter functions to terminate instructions that may be a security threat to the processor and/or flash memory before the instructions are able to cause harm to the hardware platform and associated peripherals incorporating the processor and the flash memory.

In some implementations, a central processing unit (CPU) is coupled to a flash memory via a serial peripheral interface (SPI). An SPI filter, which may be a type of processing device, is interposed between the CPU and the flash memory. The SPI filter is functional to analyze instructions generated by the CPU and provided to the flash memory. The instructions may include read or write instructions that comprise at least one command, addressing and data.

The SPI filter may analyze the instructions to determine if the at least one command, addressing and/or data may pose a security threat to the CPU and/or flash memory. For example, the SPI filter may determine that the at least one command indicates a data write to an address location of the flash memory that is read only. The SPI filter may respond to the security threat posed by the instructions by causing an early transition of a chip select (CS) signal or slave select (SS) signal. This early transition of the CS signal or SS signal will corrupt or malform the instructions determined by the SPI filter to be malicious. While the corrupted or malformed instructions may be received by the flash memory, the flash memory simply discards the corrupted or malformed instructions. Specifically, the flash memory is functional to discard corrupted or malformed instructions caused by transmission errors and the like. The flash memory simply deems the corrupted or malformed instructions as being unreadable instructions.

Various examples, implementations, scenarios, and aspects are described below with reference to FIGS. 1 through 11.

Figure 1:
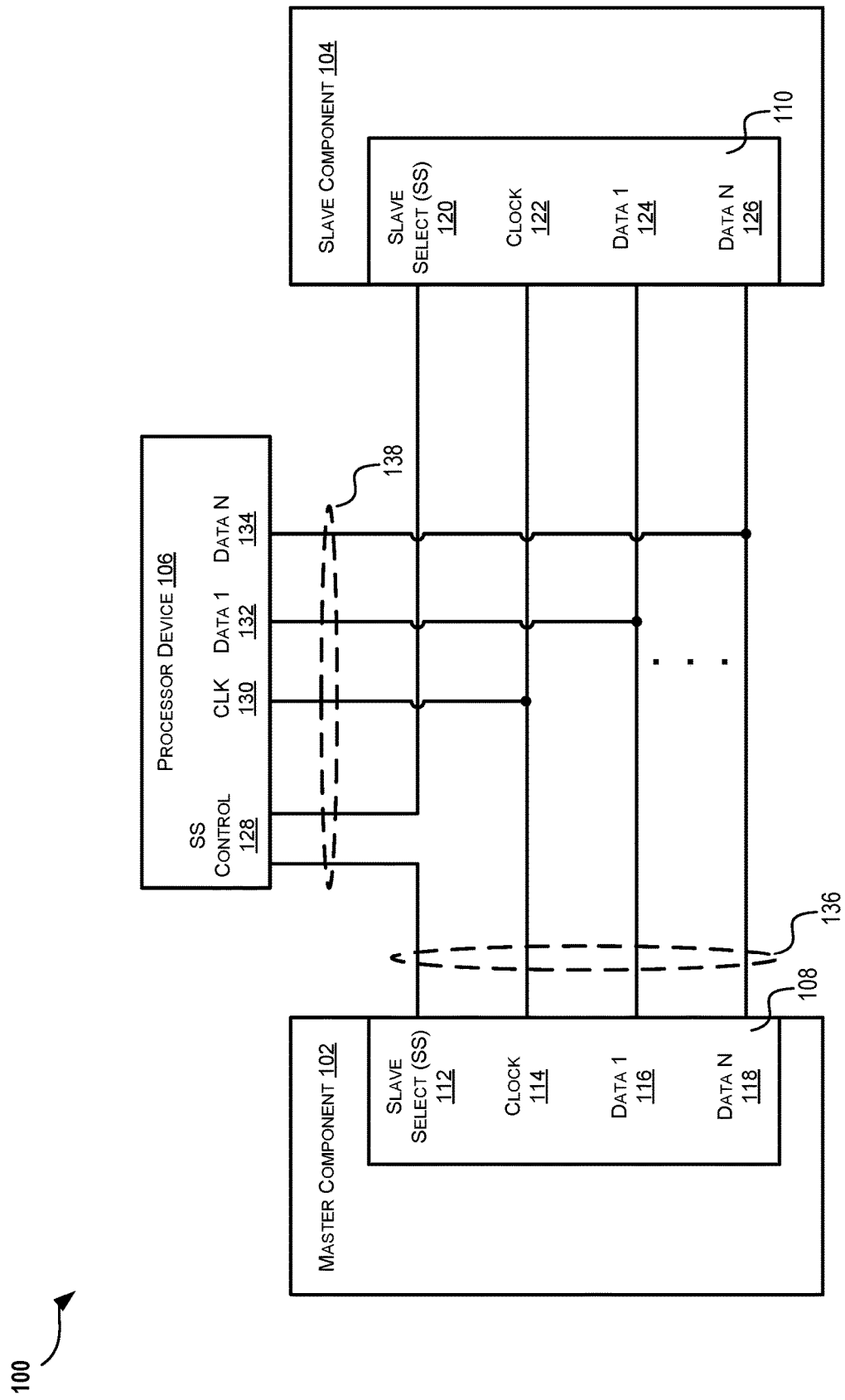
FIG. 1 illustrates an exemplary system including a master component and a slave component, in accordance with one or more exemplary implementations. A processor device may be coupled between the master component and the slave component.

FIG. 1 illustrates an exemplary system 100 including a master component 102 and a slave component 104, in accordance with one or more exemplary implementations. A processor device 106 may be coupled between the master component 102 and the slave component 104. In some implementations, the master component 102 may be associated with a motherboard in a computing device. In other implementations, the master component 102 may be associated with a peripheral card in a computing device, or other component or components of a computing device. Similarly, the slave component 104 and the processor device 106 may be associated with a motherboard or peripheral card.

Although not illustrated on FIG. 1, the master component 102 may be coupled to a plurality of slave components 104. Similarly, the processor device 106 may be coupled to a plurality of slave components.

Figure 11:
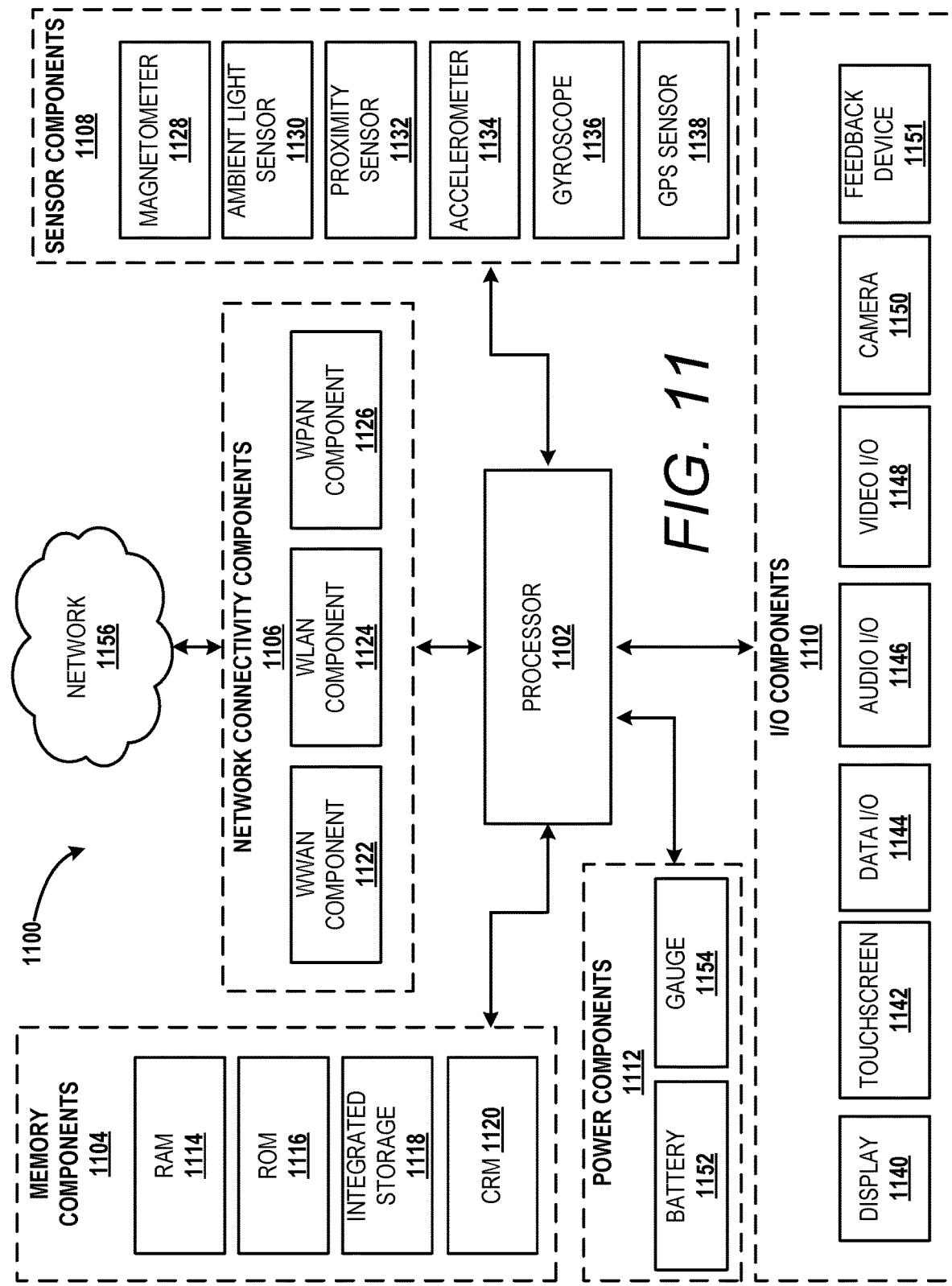
FIG. 11 illustrates a computer architecture diagram illustrating an illustrative hardware and software architecture for a computing system capable of implementing aspects of the techniques and technologies presented herein.

The exemplary systems described herein may be used by and implemented in a computing device, such as the computing device illustrated in FIG. 11.

In some implementations, the master component 102 is a processing unit. In general, the master component 102 may be a system-on-chip (SoC) that includes one or more processors, a micro controller, a microprocessor, and the like.

The slave component 104 may be a memory component, such as a flash memory. The slave component 104 may be NAND flash memory, NOR flash memory, a random-access memory (RAM), dynamic random access memory (DRAM), static random access memory (SRAM), read-only memory (ROM), programmable read-only memory (PROM), electrically erasable programmable read-only memory (EEPROM), and the like. In some implementations, the slave component 104 may be any component that is functional to receive a SS signal, where the SS signal selects the component to receive instructions and/or data from a component or components providing the SS signal.

The master component 102 may implement an interface 108 that enables connectivity to one or more external components. Furthermore, the slave component 104 may implement an interface 110 that enables connectivity to one or more external components.

In some implementations, the interfaces 108 and 110 are associated with a serial peripheral interface (SPI). In some implementations, the interfaces 108 and 110 are associated with a single-SPI interface (as illustrated on FIG. 1), a dual-SPI interface, or a quad SPI interface. The interfaces 108 and 110 may couple the master component 102 and the slave component 104 via one or more signal lines or data lines 136.

The interface 108 of the master component 102 includes connectivity for the one or more signal lines 136. Specifically, the interface 108 may include a slave select (SS) line interface 112, a clock line interface 114 and a plurality of data line interfaces 116-118. The SS line interface 112 may also be referred to herein as a chip select (CS) line interface 112. The plurality of data line interfaces 116-118 may include a plurality of data line interfaces that carry input data or output data, to include instructions, memory addressing and/or data for communication to the slave component 104. One or more of the plurality of data line interfaces 116-118 may be dedicated for receiving data, and one or more of the plurality of data line interfaces 116-118 may be dedicated for transmitting data.

Similarly, the interface 110 of the slave component 104 may include an SS line interface 120, a clock line interface 122 and a plurality of data line interfaces 124-126. The plurality of data line interfaces 124-126 may include a plurality of data line interfaces that carry input or output data, to include instructions for communication to the master component 102. One or more of the plurality of data line interfaces 124-126 may be dedicated for receiving data, and one or more of the plurality of data line interfaces 124-126 may be dedicated for transmitting data. The interfaces 112 and 120 are shown as being coupled through the processor device 106. Alternatively, the interfaces 112 and 120 may be coupled directly by way of a signal or date line, while the processor device 106 is coupled to the signal or data line to influence a SS signal communicated on the signal or data line.

In general, interfaces disclosed herein may function as a signal input and/or a signal output. Therefore, the interfaces 112-118, 120-126 and 128-134, in some implementations, are signal inputs and/or signal outputs. The foregoing is also true for additional inputs disclosed herein.

The processor device 106 may be interposed between the master component 102 and the slave component 104. In some implementations, the processor device 106 couples to the one or more signal lines 136 that connect the master component 102 and the slave component 104. Specifically, the processor device 106 may couple to the one or more signal lines 136 via one or more signal lines or data lines 138.

The processor device 106 may include an SS control interface 128, a clock interface 130, and a plurality of data line interfaces 132-134. The SS control interface 128 is functional to receive and/or influence an SS signal, also referred to as a CS signal herein, that may be provided by the master component 102. Specifically, the master component 102 may send an SS signal to the slave component 104 in order to enable or disable the slave component 104. In some implementations, a logic level low SS signal enables (e.g., selects) the slave component 104, and a logic level high SS signal disables (e.g., de-selects) the slave component 104. The processor device 106, as will be described in the following, may intervene to interrupt an SS signal provided to the slave component 104. Specifically, the processor device may intervene to interrupt an SS signal provided to the slave component 104 based on analysis of instructions, memory addressing and/or other data for communication to the slave component 104.

The clock interface 114 of the master component 102 may provide a clock signal to the slave component 104. The clock signal provided by the master component 102 may be driven with a digital clock signal to regulate a flow of bits between the master component 102 and the slave component 104. For example, the flow of bits, which may comprise instructions, memory addressing and/or data, may be latched or written in either a rising edge or a falling edge of the clock signal. The flow of bits may be associated with one or more of the data line interfaces 116-118 and one or more of the data line interfaces 124-126.

Figure 2:
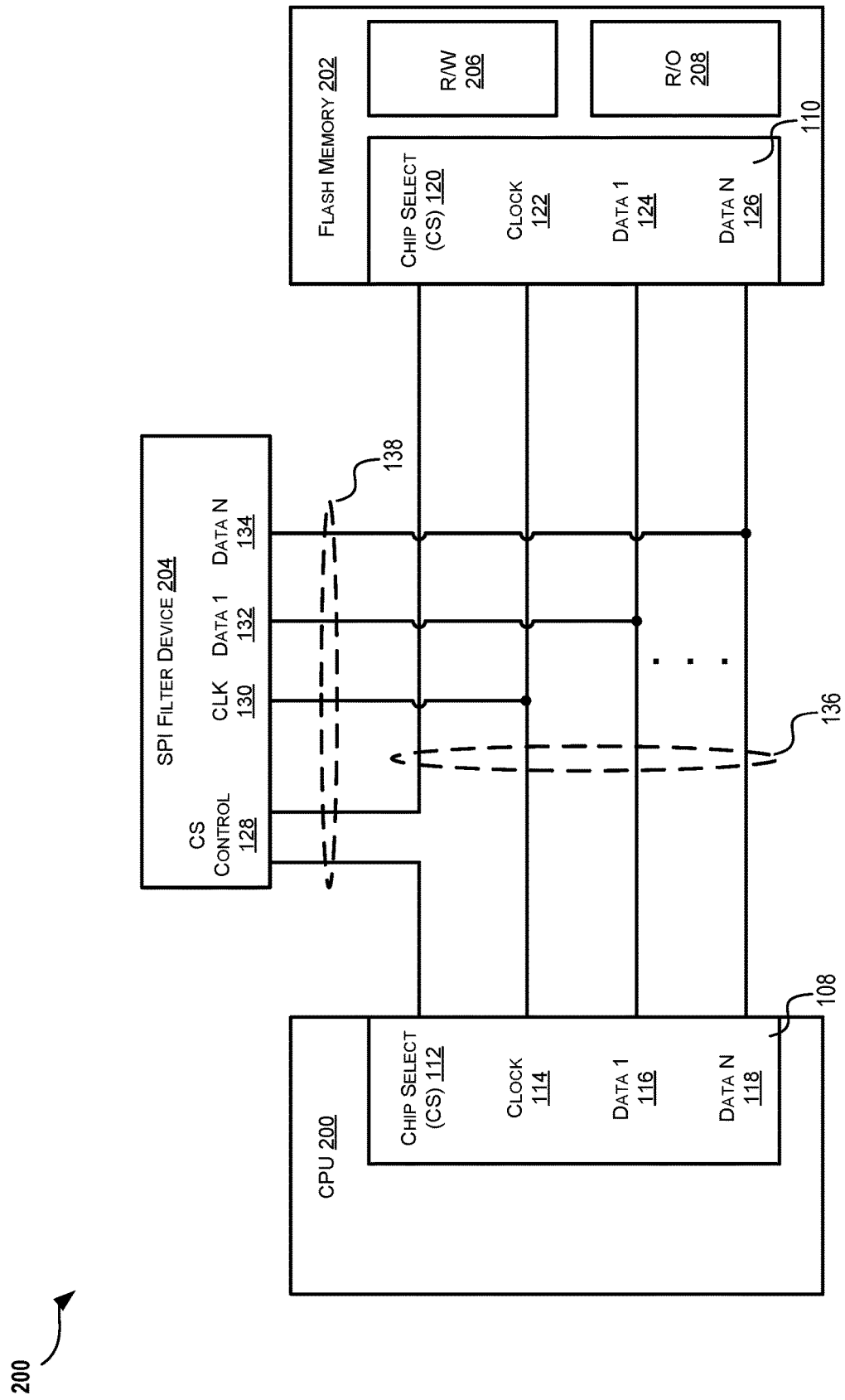
FIG. 2 illustrates an exemplary system including a central processing unit (CPU) and a flash memory, in accordance with one or more exemplary implementations. The illustrated exemplary system may be a particular implementation of the exemplary system illustrated in FIG. 1.

FIG. 2 illustrates an exemplary system 200 including a central processing unit (CPU) 200 and a flash memory 202, in accordance with one or more exemplary implementations. The exemplary system 200 may be a particular implementation of the exemplary system 100 illustrated in FIG. 1. Therefore, the exemplary system 200 may include one or more components and/or functionalities associated with the exemplary system 100.

The exemplary system 200 may include a SPI filter device 204 interposed between the CPU 200 and the flash memory 202. The SPI filter device 204 may analyze one or more instructions, memory addressing and/or data communicated from the CPU 200 to the flash memory 202. The SPI filter device 204 may interrupt a CS signal provided by the CPU 200 when the SPI filter device 204 interprets the one or more instructions, memory addressing and/or data as being a security threat to the flash memory 202 and/or the CPU 200.

The flash memory 202 may include a read and write (R/W) memory section 206 that is defined by a plurality of memory address locations associated with the flash memory 202. Furthermore, the flash memory 202 may include a read only (R/O) memory section 208 that is defined by another plurality of memory address locations associated with the flash memory 202.

In some implementations, the CPU 200 will generate and enable a CS signal, by way of the CS interface 112, in advance of transmitting an instruction, one or more memory address, and/or data to the flash memory 202. The CS signal may be received by the CS interface 120 of the flash memory 202. Similarly, the CPU 200 may provide a clock signal over the clock interface 114. The clock signal may be received by the clock signal interface 122. The CPU 200 may subsequently transmit the instruction, the one or more memory address, and/or the data to the flash memory 202. The instruction, the one or more memory address, and/or the data may be transmitted over one or more of the signal lines associated with the data line interfaces 116-118. One or more of the data line interfaces 116-118 may be a SPI master out slave in (MOSI) interface (not illustrated on FIG. 2) between the CPU 200 and the flash memory 202.

The SPI filter device 204 may analyze the instruction, the one or more memory address, and/or the data before such is received by the flash memory 202. If the analysis by the SPI filter device 204 indicates that the instruction, the one or more memory address, and/or the data may be a security threat to the CPU 200 and/or the flash memory 202, the SPI filter device 204 may intervene to disable the CS signal before the instruction, the one or more memory address, and/or the data is received by the flash memory 202. The intervention to disable the CS signal may cause the formation of a corrupt or malformed instruction, one or more memory address, and/or data, that when received by the flash memory 202, is deemed as being unreadable instructions and thereby discarded.

In one implementation, the instruction is a write instruction and the one or more memory address is associated with the read-only memory section 208. The read-only memory section 208 may include firmware instructions that the CPU 200 uses during initialization or power up of a computing device associated with the system 200. Therefore, an unauthorized write to the read-only memory section 208 may pose a security threat to the CPU 200 and/or the flash memory 202.

To prevent the unauthorized write to the memory address associated with the read-only memory section 208, the SPI filter device 204 intervenes to disable the CS signal before the entire instruction is clocked through to the flash memory 202 and/or before the entire one or more memory address is clocked through to the flash memory 202. Disabling the CS signal in such a manner results in a malformed or corrupt instruction, one or more memory address, and/data that is received by the flash memory 202. The flash memory 202, in response to receiving the malformed or corrupt instruction, one or more memory address, and/or data, discards the received malformed or corrupt instruction, one or more memory address, and/or data.

The SPI filter device 204 may intervene to prevent successful communication of other types of instructions (e.g., instruction commands, memory addressing, data) to the flash memory 202. For example, the SPI filter device 204 may intervene to prevent successful communication of an erase command, password unlock command, lock command, reset command, and the like. In general, the SPI filter device 204 may intervene to prevent successful communication of an instruction to the flash memory 202 by disabling the CS signal during the clocking cycle of a command associated with the instruction, or during the clocking cycle of a memory address associated with the instruction.

Figure 3:
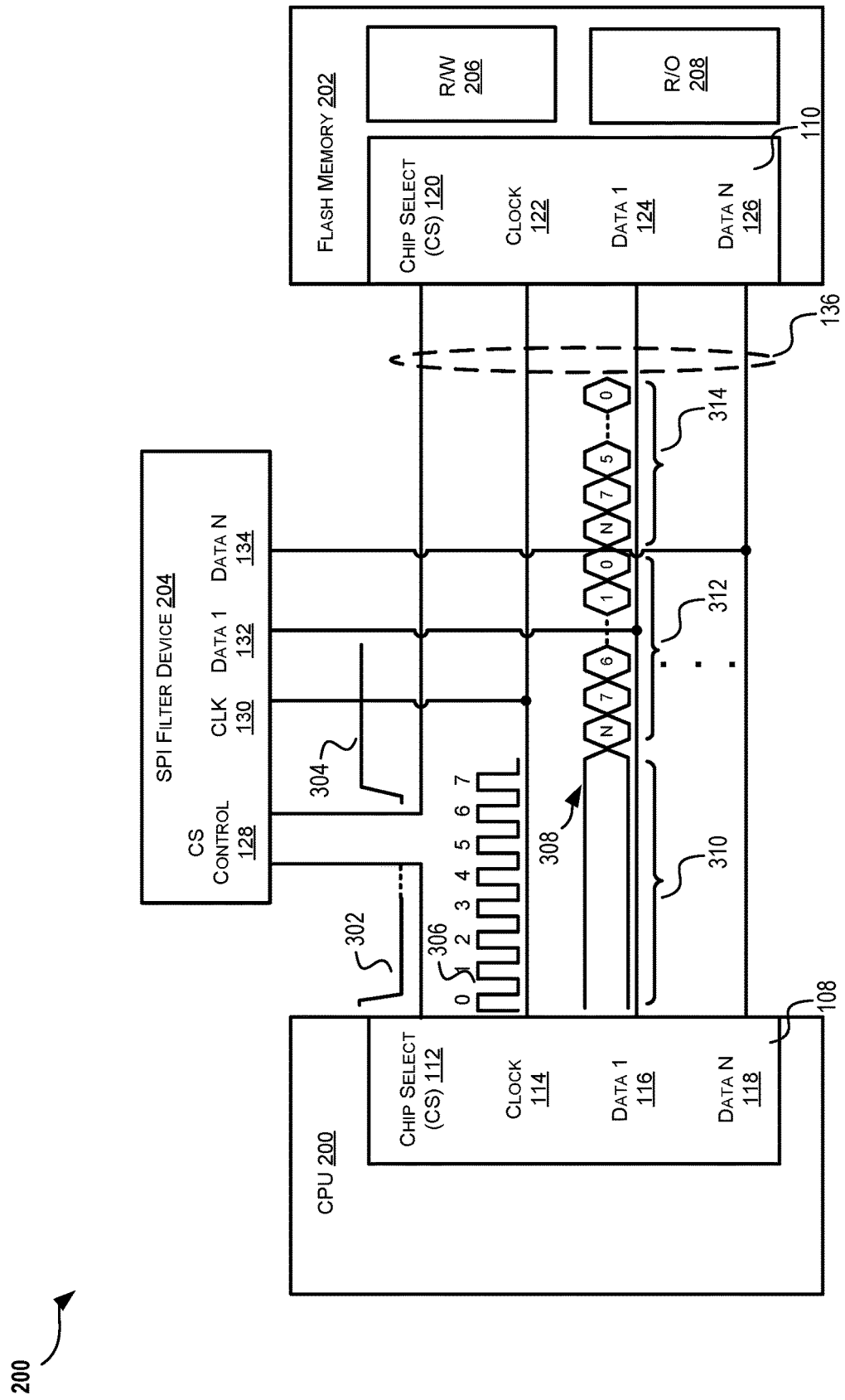
FIG. 3 illustrates additional functional details of the exemplary system illustrated in FIG. 2. Specifically, signals associated with the exemplary system are shown in FIG. 3.

FIG. 3 illustrates additional functional details of the exemplary system 200 illustrated in FIG. 2. Specifically, signals associated with the exemplary system 200 are shown in FIG. 3. For example, FIG. 3 illustrates an enabled CS signal 302, a disabled CS signal 304, a clock signal 306, and an instruction 308. The illustration of FIG. 3 and the associated description provide further specifics related to the function of the SPI filter device 204.

In advance of sending the instruction 308 to the flash memory 202, by way of the data interface 116, the CPU 200 asserts or enables the CS signal 302 to select the flash memory 202. In some implementations, asserting or enabling the CS signal 302 includes driving the CS signal 302 to a logic level low. Enabling the CS signal 302 selects the flash memory 202 so that it is ready to receive the instruction 308.

The instruction 308 may include a command 310 (e.g. write command), memory addressing 312 associated with the flash memory 202 and/or data 314. In some implementations, the instruction 308 includes a plurality of bits, where each of the bits is associated with the command 310, the memory addressing 312, or the data 314. The command 310 may comprise 8 bits, each address associated with the memory addressing 312 may comprise 8 bits and the data 314 may comprise one or more 8 bit sections. One clock cycle of the clock signal 306 may correspond to a single bit of the instruction 308 on the data interface 116.

Depending on the data communication mode (i.e., dual SPI or quad SPI) selected by CPU 200, data bits may also be communicated over a plurality of the data lines 136. Again, one clock cycle of the clock signal 306 may correspond to a single bit of the data bits communicated over the plurality of data lines 136.

The SPI filter device 204 may function to intercept the instruction 308 before the instruction 308 is completely communicated to the flash memory 202. For example, analysis of the instruction 308, by the SPI filter device 204, may indicate that the instruction 308 poses a security threat to the CPU 200 and/or the flash memory 202. Based on the analysis, the SPI filter device 204 may disable or deselect the CS signal 302 to provide the disabled CS signal 304. In some implementations, providing the disabled CS signal 304 comprises causing the enabled CS signal 302 to transition to a logic level high.

As a result of the disabled CS signal 304, the instruction 308 is caused to be malformed or corrupted. While the malformed or corrupted instruction 308 may be received by the flash memory 202, the flash memory 202 will discard the malformed or corrupted instruction 308. Therefore, the command 310 and data 314 have no effect on the flash memory 202. For example, the data 314, assuming that the command 310 is a write command, will not be written to the read or write section 206 or the read only section 208 of the flash memory 202.

In some implementations, the enabled CS signal 302 may be disabled to provide the disabled CS signal 304 before the clocking of the last bit of the command 310, the memory addressing 312 or the data 314 is complete. In some implementations, the clock signal 306 writes or latches a bit of the command 310, the memory addressing 312 or the data 314 during every clock cycle. Therefore, the SPI filter device 204 may intervene to provide the disabled CS signal 304 within half of a cycle of the clock signal 306.

Figure 4:
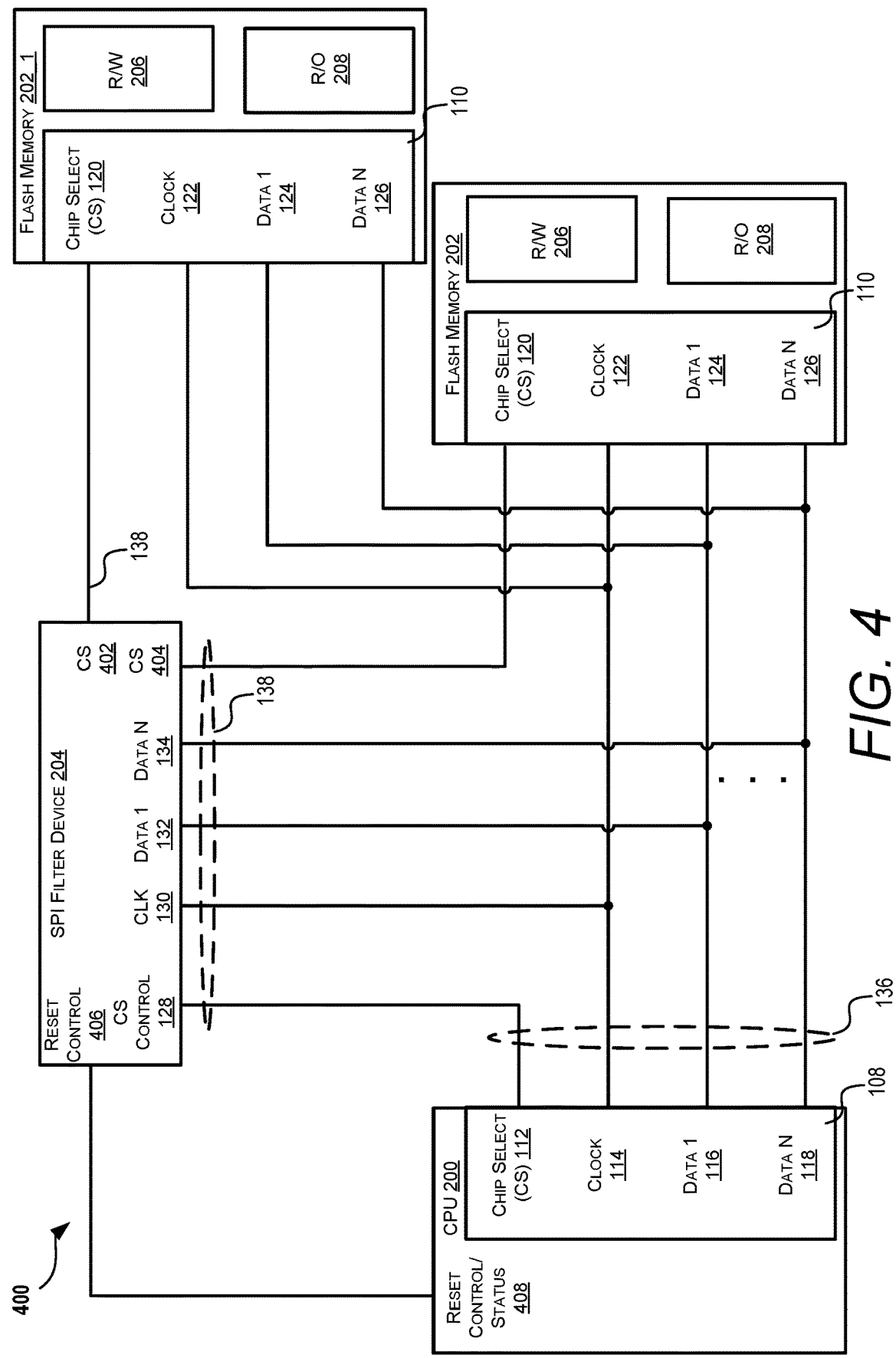
FIG. 4 illustrates an exemplary system including a CPU and a plurality of flash memories, in accordance with one or more exemplary implementations. The illustrated exemplary system may be a modified implementation of the exemplary systems illustrated in FIGS. 1-3.

FIG. 4 illustrates an exemplary system 400 including the CPU 200 and a plurality of flash memories 202 and 202_1, in accordance with one or more exemplary implementations. The illustrated exemplary system 400 may be a modified implementation of the exemplary systems 100 and 200 illustrated in FIGS. 1-3.

The exemplary system 400 may include the CPU 200 and the flash memories 202 and 202_1. Furthermore, the exemplary system 400 may include the SPI filter device 204. As illustrated, the SPI filter device 204 is modified to include a CS interface 402 and a CS interface 404. A CS signal provided by the CS interface 112 may be received by the CS control interface 128.

The SPI filter device 204 may communicate the CS signal received at the CS control interface 128 to the CS interface 402 and the CS interface 404. Furthermore, the SPI filter device 204, by way of the CS control interface 128, may enable or disable a CS signal provided by the CS interface 402. Additionally, the SPI filter device 204, by way of the CS control interface 128, may enable or disable a CS signal provided by the CS interface 404.

A CS signal provided by the CS interface 402 enables or disables the flash memory 202_1. A signal provided by the CS interface 404 enables or disables the flash memory 202. The SPI filter device 204 may interrupt a CS signal provided by the CPU 200 when the SPI filter device 204 interprets the one or more instructions, memory addressing and/or data as being a security threat to the flash memory 202, the flash memory 202_1 and/or the CPU 200.

The SPI filter device 204 further includes a reset control interface 406. The reset control interface 406 is in communication with a reset control and status interface 408 of the CPU 200. As will be described in the following in connection with FIGS. 5-8, the SPI filter device 204 may use the reset control interface 406 to monitor a reset status associated with the CPU 200. The CPU 200 may enter a reset mode when it attempts to write new firmware instructions to a read only section of a flash memory. Subsequently, after the new firmware instructions are written to the read only section of the flash memory, the CPU 200 may reboot to exit the reset mode and read the new firmware instructions that were written to the read only section of the flash memory. The exemplary system 400 allows for verification of new firmware instructions before the CPU 200 reads the new firmware instructions from a flash memory. Additional details and functionality associated with the exemplary system 400 are provided in the following description of FIGS. 5-8.

FIGS. 5-8 illustrate additional details of the exemplary system 400 including the CPU 200 and the plurality of flash memories 202 and 202_1, in accordance with one or more exemplary implementations. Specifically, signals associated with the exemplary system 400 are shown in FIGS. 5-8. For example, FIGS. 5-8 illustrate an enabled CS signal 502, a clock signal 506, and an instruction 508. The enabled CS signal 502 may be conveyed to the flash memory 202_1 and the flash memory 202 by way of the SPI filter device 204. The illustrations of FIGS. 5-8 and the associated description provide further specifics related to the function of the SPI filter device 204.

Figure 5:
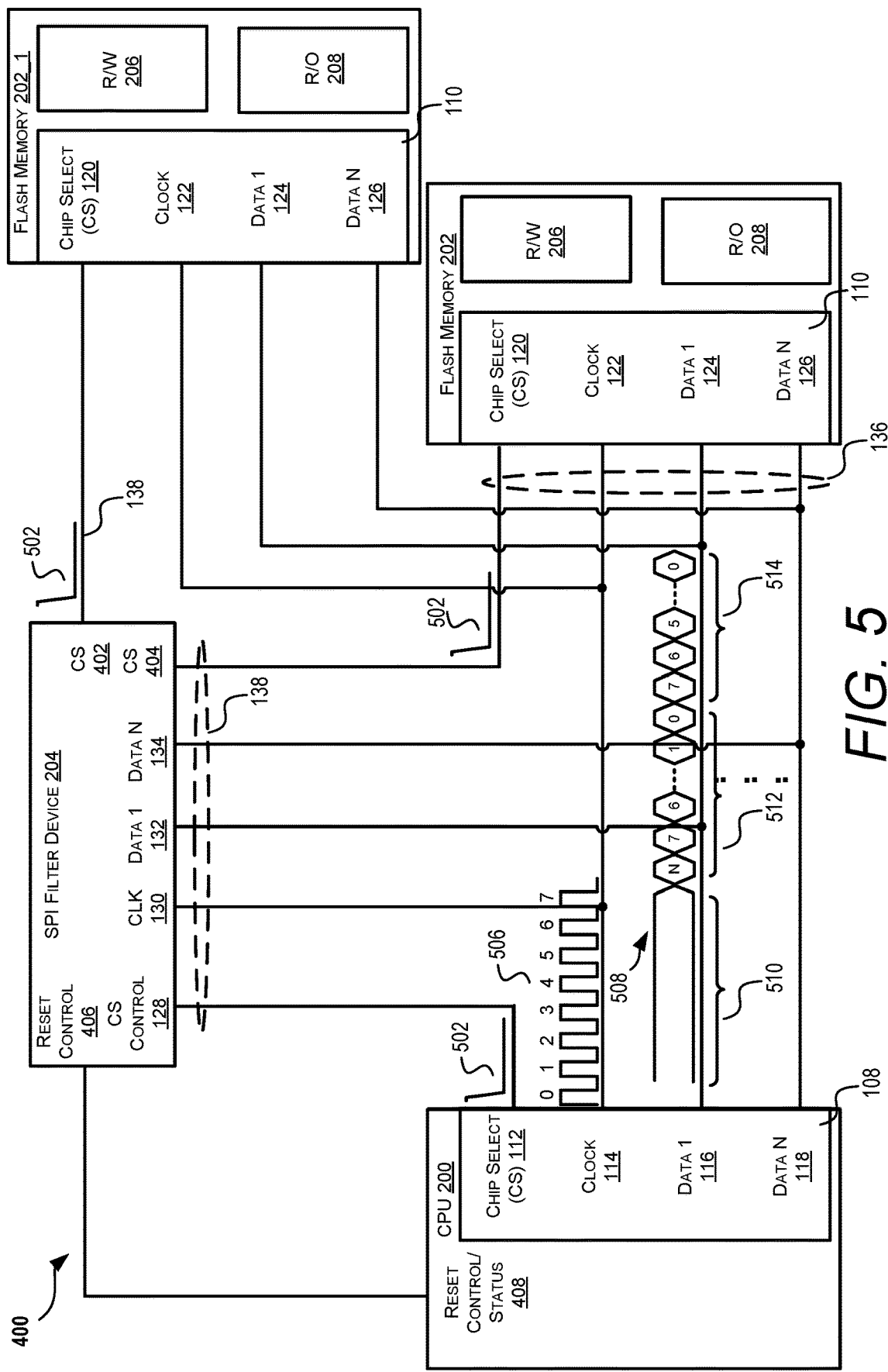
FIGS. 5-8 illustrate additional details of the exemplary system including the CPU and the plurality of flash memories, illustrated in FIG. 4, in accordance with one or more exemplary implementations.

Turning now to FIG. 5, in advance of sending the instruction 508 to the flash memories 202 and 202_1, by way of the data interface 116, the CPU 200 asserts or enables the CS signal 502 to select the flash memories 202 and 202_1. In some implementations, asserting or enabling the CS signal 502 includes driving the CS signal 502 to a logic level low. Enabling the CS signal 502 selects the flash memories 202 and 202_1 so that the flash memories 202 and 202_1 are enabled or selected to receive the instruction 508.

The instruction 508 may include a command 510 (e.g. write command), memory addressing 512 associated with the flash memories 202 and 202_1 and/or data 514. In some implementations, the instruction 508 includes a plurality of bits, where each of the bits is associated with the command 510, the memory addressing 512, or the data 514. The command 510 may comprise 8 bits, each address associated with the memory addressing 512 may comprise 8 bits and the data 514 may comprise one or more 8 bit sections. One clock cycle of the clock signal 506 may correspond to a single bit of the instruction 508 on the data interface 116.

Depending on the data communication mode (i.e., dual SPI or quad SPI) selected by the CPU 200, data bits may also be communicated over a plurality of the data lines 136. Again, one clock cycle of the clock signal 506 may correspond to a single bit of the data bits communicated over the plurality of data lines 136.

Figure 6:
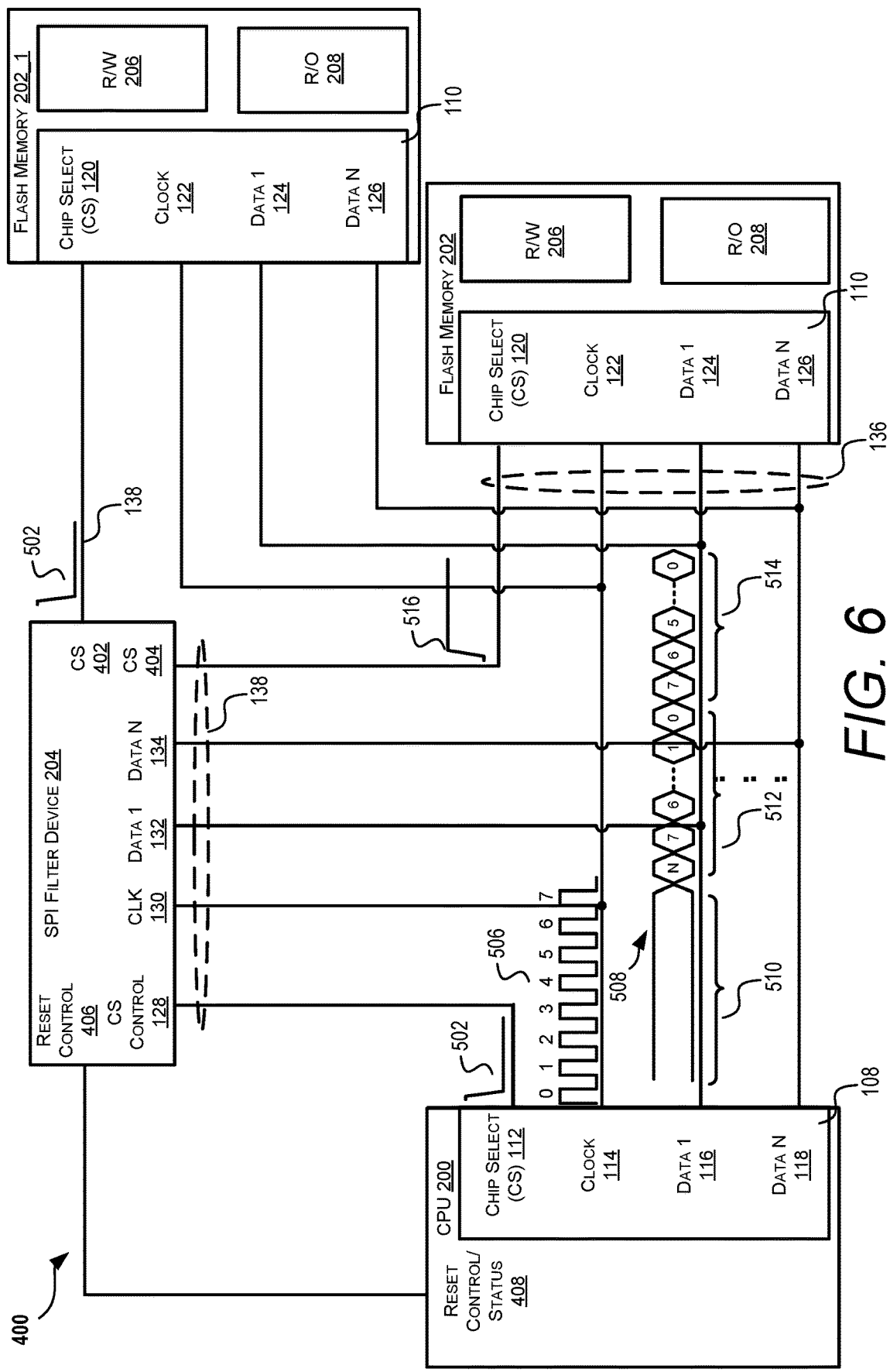

Turning now to FIG. 6, the SPI filter device 204 may function to intercept the instruction 508 before the instruction 508 is completely communicated to the flash memory 202 and/or the flash memory 202_1. For example, analysis of the instruction 508, by the SPI filter device 204, may indicate that the instruction 508 poses a security threat to the CPU 200, the flash memory 202 and/or the flash memory 202_1. Based on the analysis, the SPI filter device 204 may disable or deselect the CS signal 502 to provide a disabled CS signal 516 to at least one of the flash memories 202 and 202_1. In some implementations, providing the disabled CS signal 516 comprises causing the enabled CS signal 516 to transition to a logic level high.

As a result of the disabled CS signal 516, the instruction 508 is caused to be malformed or corrupted. While the malformed or corrupted instruction 508 may be received by the flash memory 202 and/or 202_1, the flash memory 202 and/or 202_1 will discard the malformed or corrupted instruction 508. Therefore, the command 510 and data 514 have no effect on the flash memory 202 and/or 202_1. For example, the data 514, assuming that the command 510 is a write command, will not be written to the read or write section 206 or the read only section 208 of either the flash memory 202 or 202_1.

In some implementations, the enabled CS signal 502 may be disabled to provide the disabled CS signal 516 before the clocking of the last bit of the command 510, the memory addressing 512 or the data 514 is complete. In some implementations, the clock signal 506 writes or latches a bit of the command 510, the memory addressing 512 or the data 514 during every clock cycle. Therefore, the SPI filter device 204 may intervene to provide the disabled CS signal 516 within half of a cycle of the clock signal 506.

A particular use of the exemplary system 400 will be described in the following. From time to time, the CPU 200 may provide updated firmware instructions to the flash memory 202 and/or the flash memory 202_1. The following description will describe a process of writing updated firmware instructions to the flash memory 202 and/or the flash memory 202_1.

The instruction 508 includes the command 510, which is a write command. Furthermore, the instruction 508 includes data 514, which is firmware data that is to be written to read only memory sections 208. The instruction 508 further includes the memory addressing 512 for the read only memory sections 208.

The SPI filter device 204 may interpret the command 510 as being a security threat to the CPU 200, the flash memory 202 and/or the flash memory 202_1. Specifically, analysis by the SPI filter device 204 shows that the CPU 200 is attempting to write data to the read only memories 208. The SPI filter 204 intervenes to disable the CS signal 502 to provide a disabled CS signal 516 to the flash memory 202. This action of providing the disabled CS signal 516 to the flash memory 202 causes the flash memory 202 to receive a corrupt or malformed version of the instruction 508. As described in the foregoing, the flash memory 202 will simply discard the corrupt or malformed version of the instruction 508.

Although the SPI filter device 204 interpreted the command 510 as being a security threat, the SPI filter device 204 does not disable the enabled CS signal 502 that is provided to the flash memory 202_1. Therefore, the flash memory 202_1 will receive the instruction 508 and store its associated data 514 in the read-only memory section 208 of the flash memory 202_1.

In some implementations, the SPI filter device 204, via any one or more of the data lines 138, may perform a firmware certification process on the data 514 (i.e., updated firmware data) stored in the read only memory section 208 of the flash memory 202_1. Furthermore, as part of the firmware certification process, the SPI filter device 204 may hold the CPU 200 in reset by way of the reset control interface 406 and the reset control and status interface 408. The SPI filter device 204 may send a signal to the CPU 200 to cause the CPU 200 to be held in reset while a firmware certification process is performed by the SPI filter device 204 and/or an external firmware certification device. In some implementations, the firmware certification process performed by the SPI filter device 204 includes verifying a digital signature associated with the data 514. The digital signature may be created, for example, from a private key, wherein the digital signature associated with the data 514 is verified by the SPI filter device 204 using an associated public key. Other firmware certification processes may be performed by the SPI filter device 204.

If the firmware certification process associated with the flash memory 202_1 fails, the connectivity between CPU 200 and the flash memory 202 will be maintained. Furthermore, in some implementations, the SPI filter device 204 may wipe all data stored in the flash memory 202_1. However, if the certification process associated with the flash memory 202_1 confirms that valid firmware data was written to the read-only memory section 208 of the flash memory 202_1, the SPI filter device 204 will permit the CPU 200 to communicate with the flash memory 202_1. In one example, the SPI filter 204 will update the reset status associated with the CPU 200, by way of the reset control interface 406 and the reset control and status interface 408, to enable the CPU 200 to latch (i.e., read). The updated firmware is stored in the read-only memory section 208 of the flash memory 202_1.

Figure 7:
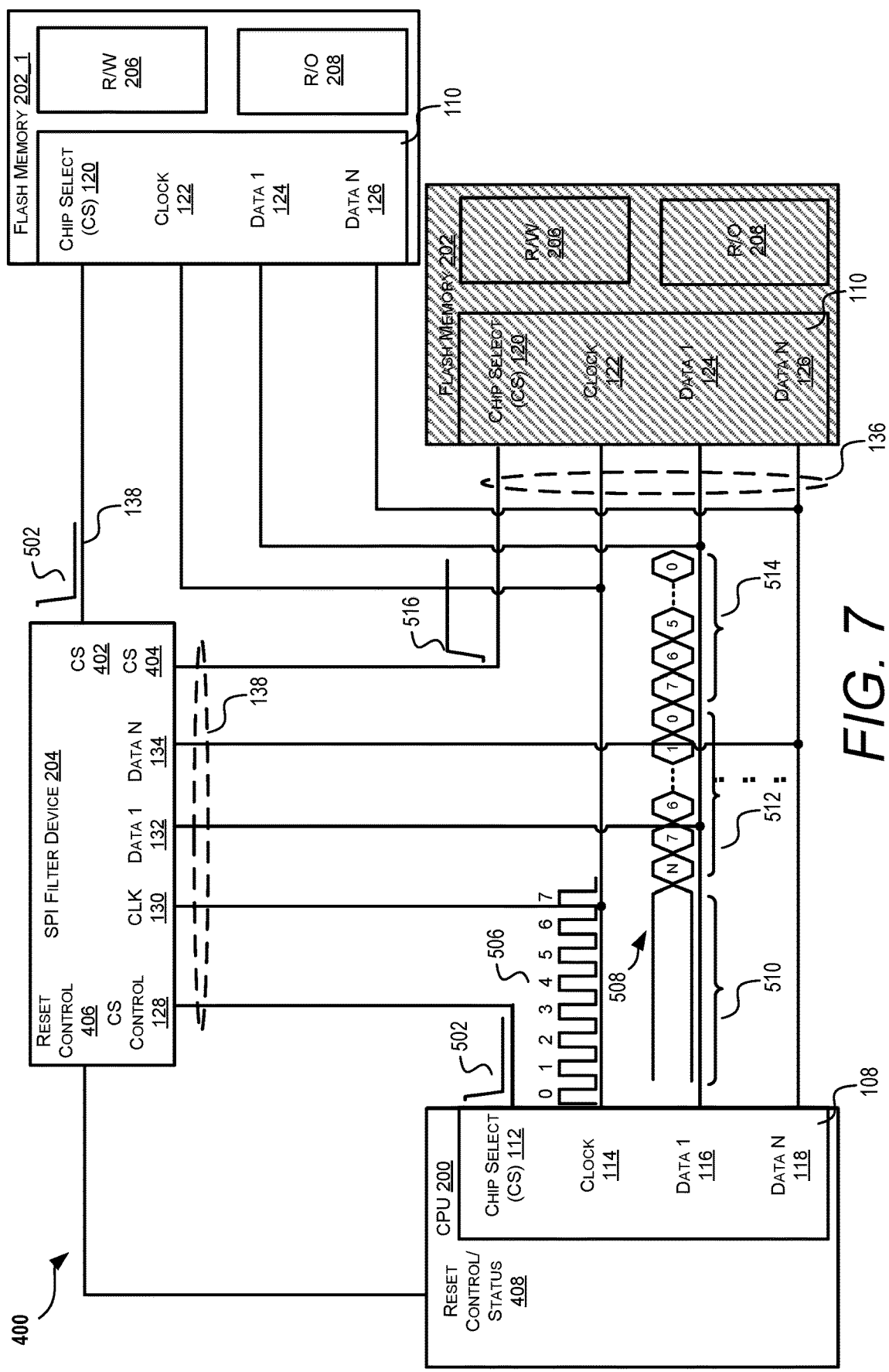

FIG. 7 illustrates the exemplary system 400 after a successful firmware certification process of the flash memory 202_1. Specifically, the SPI filter device 204 may maintain the disabled CS signal 516 so that the flash memory 202 is not selected.

Figure 8:
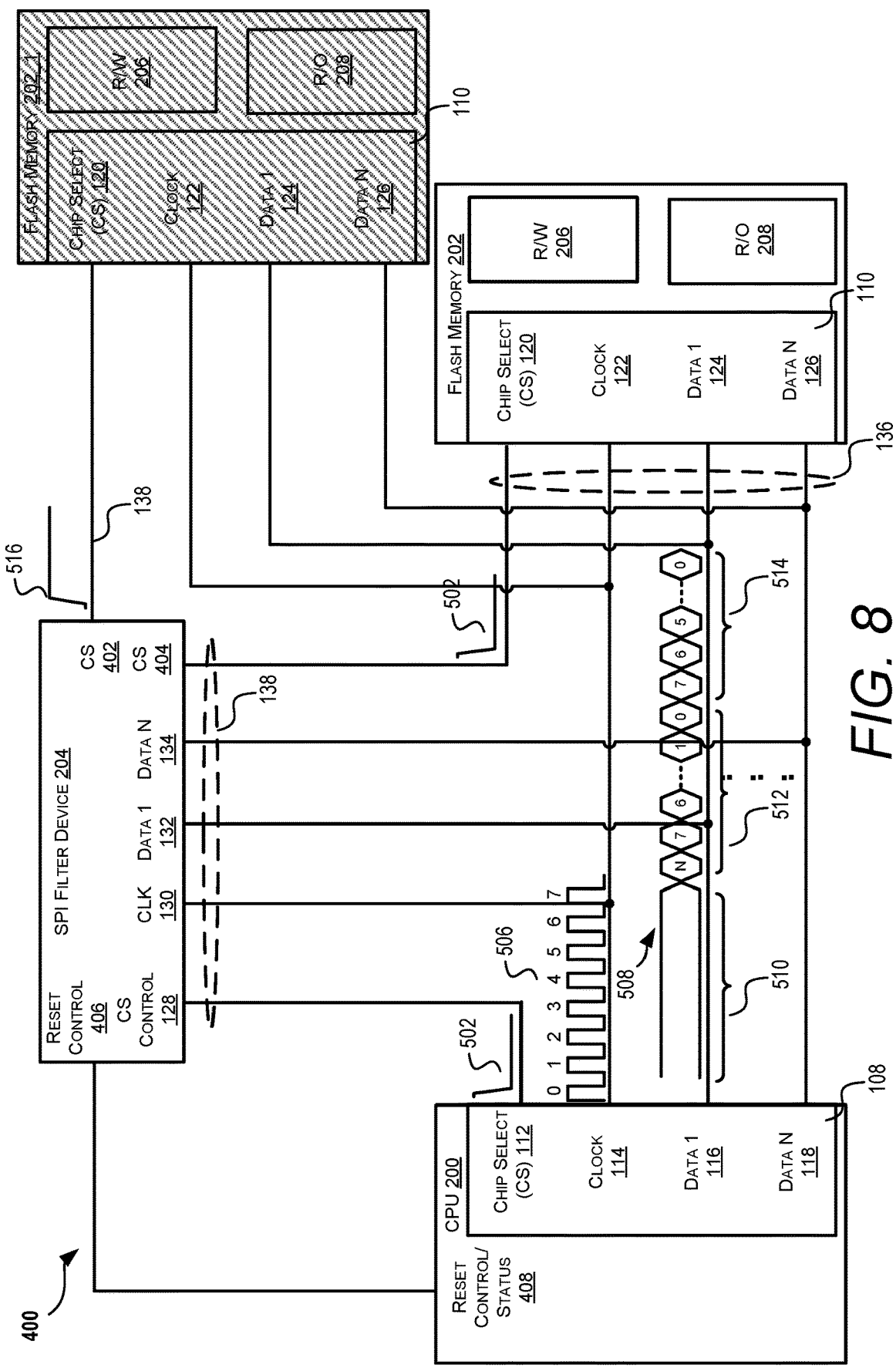

FIG. 8 illustrates the exemplary system 400 after an unsuccessful firmware certification process of the flash memory 202_1. Specifically, the SPI filter device 204 may cause the CS signal provided by the CS interface 402 to transition to the disabled CS signal 516. Therefore, the flash memory 202_1 is not selected. Similarly, the SPI filter device 204 may cause the CS signal provided by the CS interface 404 to transition to the enabled CS signal 502. This selects the flash memory 202 for use by the CPU 200.

Figure 9:
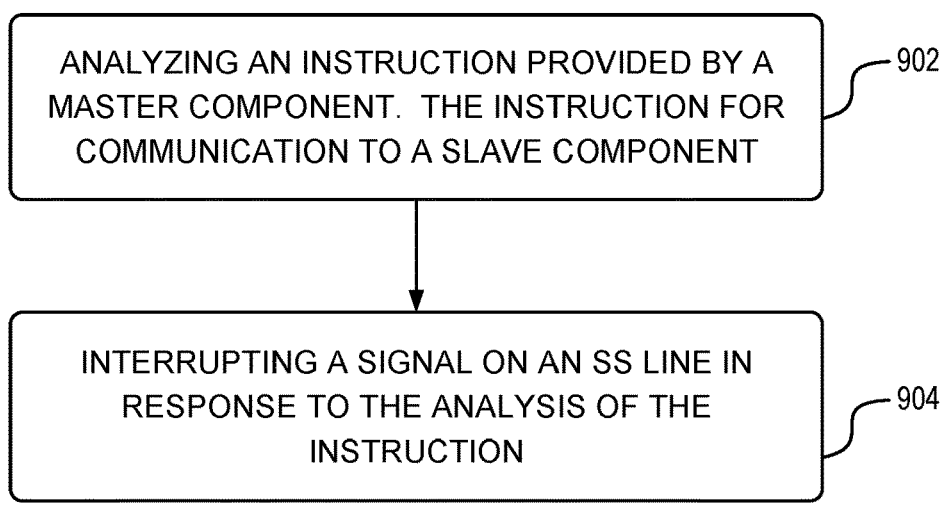
FIGS. 9-10 include diagrams of example flowcharts, respectively, that illustrate operations associated with analyzing and filtering instructions associated with master and slave devices
Figure 10:
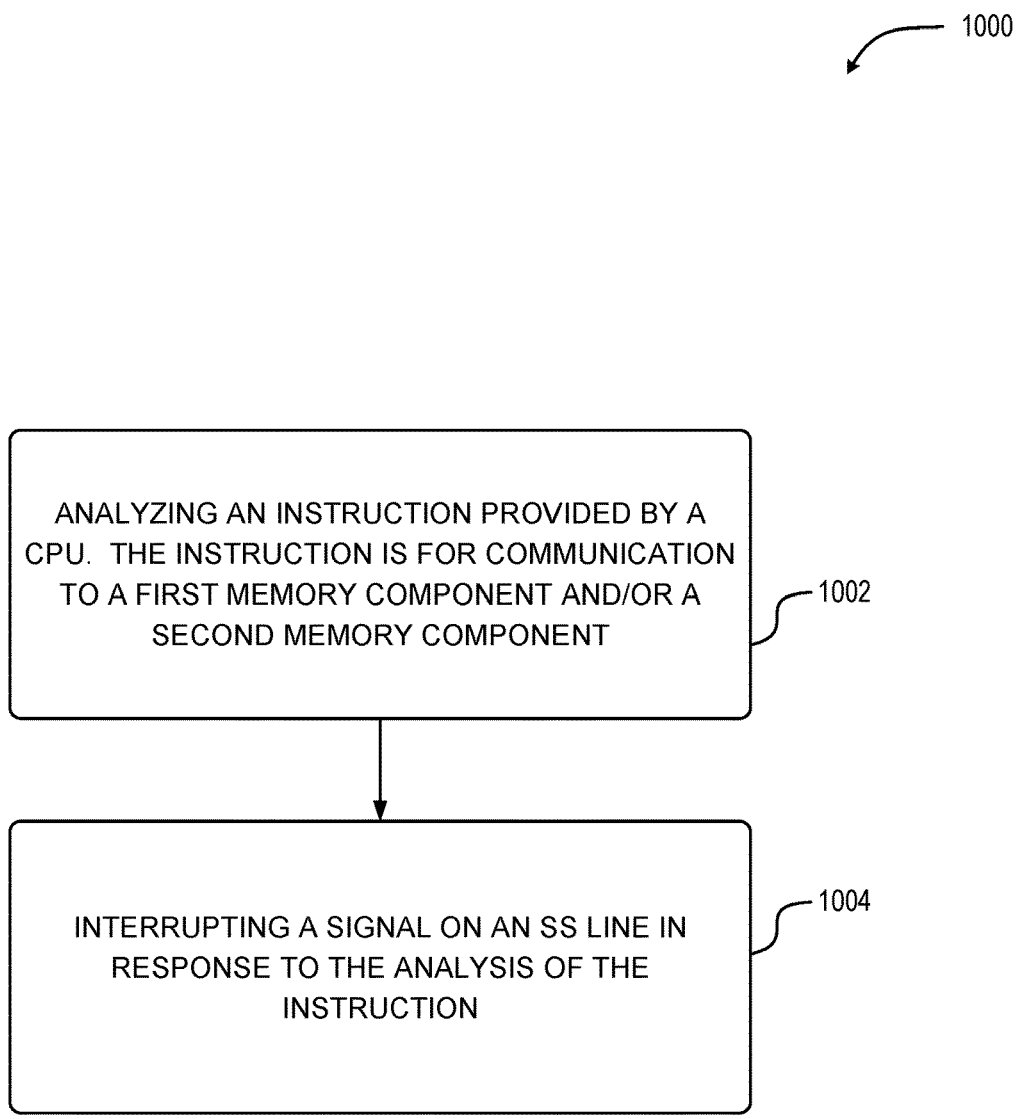

FIGS. 9-10 include diagrams of example flowcharts 900 and 1000, respectively, that illustrate operations associated with analyzing and filtering instructions associated with master and slave devices. In one example, the operations of FIGS. 9-10 can be performed by components of one or more of the exemplary systems illustrated and described hereby. Therefore, the instructions associated with the example flowcharts 900 and 1000 may be performed by the described exemplary processor devices and/or filter devices.

Turning to FIG. 9, at operation 902, a processor device coupled between a master component and a slave component analyzes an instruction provided by the master component. The instruction is for communication to the slave component.

At operation 904, the processor device coupled between the master component and the slave component interrupts a signal on a SS line in response to the analysis of the instruction. Interrupting the signal on the SS line in response to the analysis of the instruction may cause the formation of a corrupt or malformed instruction. The SS line may couple the master component to the slave component. A signal on the SS line may be used by the master component to select the slave component for receiving instructions that may include a command (e.g. a write command), memory addressing associated with memory of the slave component and/or data for storage in the memory.

Turning to FIG. 10, at operation 1002, a SPI filter device coupled between a CPU, a first memory component and a second memory component analyzes an instruction provided by the CPU. The instruction is for communication to the first memory component and/or the second memory component.

At operation 1004, the SPI filter device coupled between the first memory component and the second memory component interrupts a signal on a first CS output or a second CS output in response to the analysis of the instruction. In some implementations, a SPI filter device includes a CS input and the first and second CS outputs, the CS input coupled to the CS output of the SPI filter device, the first CS output coupled to the CS input of the first flash memory component and the second CS output coupled to the CS input of the second flash memory component.

Turning now to FIG. 11, an illustrative computing device architecture 1100 for computing devices that may implement the exemplary systems described herein. The computing device architecture 1100 is applicable to computing devices that facilitate mobile computing due, in part, to form factor, wireless connectivity, and/or battery-powered operation. In some configurations, the computing devices include, but are not limited to, digital pens, digital inking devices, mobile telephones, tablet devices, slate devices, portable video game devices, and the like.

The computing device architecture 1100 is applicable to any of the computing devices shown in the accompanying figures. Moreover, aspects of the computing device architecture 1100 may be applicable to traditional desktop computers, portable computers, e.g., phones, laptops, notebooks, ultra-portables, and netbooks, server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse. In some implementations, some or all of the computer device architecture 1100 implements one or more of the exemplary systems or devices described herein.

The computing device 1100 illustrated in FIG. 11 includes a processor 1102, memory components 1104, network connectivity components 1106, sensor components 1108, input/output components 1110, and power components 1112. In the illustrated configuration, the processor 1102 is in communication with the memory components 1104, the network connectivity components 1106, the sensor components 1108, the input/output ("I/O") components 1110, and the power components 1112. Although no connections are shown between the individual components illustrated in FIG. 11, the components can interact to carry out device functions. In some configurations, the components are arranged so as to communicate via one or more busses (not shown on FIG. 11).

The processor 1102 includes a central processing unit ("CPU") configured to process data, execute computer-executable instructions of one or more application programs, and communicate with other components of the computing device architecture 1100 in order to perform various functionality described herein. The processor 1102 may be utilized to execute aspects of the software components presented herein and, particularly, those that utilize, at least in part, a touch-enabled input.

In some configurations, the processor 1102 includes a graphics processing unit ("GPU") (not shown on FIG. 11) configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1102 is configured to communicate with a discrete GPU (not shown on FIG. 11). In any case, the CPU and GPU may be configured in accordance with a co-processing CPU/GPU computing model, wherein the sequential part of an application executes on the CPU and the computationally-intensive part is accelerated by the GPU.

In some configurations, the processor 1102 is, or is included in, a system-on-chip ("SoC") (not shown on FIG. 11) along with one or more of the other components described herein below. For example, the SoC may include the processor 1102, a GPU, one or more of the network connectivity components 1106, and one or more of the sensor components 1108. In some configurations, the processor 1102 is fabricated in part utilizing a package-on-package ("PoP") integrated circuit packaging technique. The processor 1102 may be a single core or multi-core processor.

The processor 1102 may be created in accordance with an ARM architecture, available for license from ARM HOLDINGS of Cambridge, United Kingdom. Alternatively, the processor 1102 may be created in accordance with an x86 architecture, such as is available from INTEL CORPORATION of Mountain View, Calif. and others. In some configurations, the processor 1102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1104 include a random-access memory ("RAM") 1114, a read-only memory ("ROM") 1116, an integrated storage memory ("integrated storage") 1118, and a computer readable medium ("CRM") 1120. In some configurations, the RAM 1114 or a portion thereof, the ROM 1116 or a portion thereof, and/or some combination of the RAM 1114 and the ROM 1116 is integrated in the processor 1102. In some configurations, the ROM 1116 is configured to store a firmware, an operating system or a portion thereof (e.g., operating system kernel), and/or a bootloader to load an operating system kernel from the integrated storage 1118 and/or the CRM 1120.

The integrated storage 1118 can include a solid-state memory, a hard disk, or a combination of solid-state memory and a hard disk. The integrated storage 1118 may be soldered or otherwise connected to a logic board upon which the processor 1102 and other components described herein also may be connected. As such, the integrated storage 1118 is integrated in the computing device. The integrated storage 1118 is configured to store an operating system or portions thereof, application programs, data, and other software components described herein.

The computer-readable media (CRM) 1120 can include a solid-state memory, a hard disk, or a combination of solid-state memory and a hard disk. In some configurations, the CRM 1120 is provided in lieu of the integrated storage 1118. In other configurations, the CRM 1120 is provided as additional optional storage. In some configurations, the CRM 1120 is logically combined with the integrated storage 1118 such that the total available storage is made available as a total combined storage capacity. In some configurations, the total combined capacity of the integrated storage 1118 and the CRM 1120 is shown to a user instead of separate storage capacities for the integrated storage 1118 and the removable storage 1120.

As used herein, computer-readable media can store instructions executable by the processing unit(s) 1102. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

It can be understood that one or more of the memory components 1104 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1106 include a wireless wide area network component ("WWAN component") 1122, a wireless local area network component ("WLAN component") 1124, and a wireless personal area network component ("WPAN component") 1126. The network connectivity components 1106 facilitate communications to and from the network 1156 or another network, which may be a WWAN, a WLAN, or a WPAN. Although only the network 1156 is illustrated, the network connectivity components 1106 may facilitate simultaneous communication with multiple networks, including the networks referred to in any description herein. For example, the network connectivity components 1106 may facilitate simultaneous communications with multiple networks via one or more of a WWAN, a WLAN, or a WPAN.

The network 1156 may be or may include a WWAN, such as a mobile telecommunications network utilizing one or more mobile telecommunications technologies to provide voice and/or data services to a computing device utilizing the computing device architecture 1100 via the WWAN component 1122. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1156 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1156 may be configured to provide voice and/or data communications with any combination of the above technologies. The network 1156 may be configured to or adapted to provide voice and/or data communications in accordance with future generation technologies.

In some configurations, the WWAN component 1122 is configured to provide dual-multi-mode connectivity to the network 1156. For example, the WWAN component 1122 may be configured to provide connectivity to the network 1156, wherein the network 1156 provides service via GSM and UMTS technologies, or via some other combination of technologies. Alternatively, multiple WWAN components 1122 may be utilized to perform such functionality, and/or provide additional functionality to support other non-compatible technologies (i.e., incapable of being supported by a single WWAN component). The WWAN component 1122 may facilitate similar connectivity to multiple networks (e.g., a UMTS network and an LTE network).

The network 1156 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that is functioning as a WI-FI hotspot. The WLAN component 1124 is configured to connect to the network 1156 via the WI-FI access points. Such connections may be secured via various encryption technologies including, but not limited to, WI-FI Protected Access ("WPA"), WPA2, Wired Equivalent Privacy ("WEP"), and the like.

The network 1156 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1126 is configured to facilitate communications with other devices, such as peripherals, computers, or other computing devices via the WPAN. For instance, all digital inking devices 100 disclosed herein can be in communication with a paired computer 101 via a BLUETOOTH connection, a WI-FI connection, WI-FI DIRECT connection, etc.

The sensor components 1108 include a magnetometer 1128, an ambient light sensor 1130, a proximity sensor 1132, an accelerometer 1134, a gyroscope 1136, and a Global Positioning System sensor ("GPS sensor") 1138. It is contemplated that other sensors, such as, but not limited to, temperature sensors or shock detection sensors, also may be incorporated in the computing device architecture 1100.

The magnetometer 1128 is configured to measure the strength and direction of a magnetic field. In some configurations the magnetometer 1128 provides measurements to a compass application program stored within one of the memory components 1104 in order to provide a user with accurate directions in a frame of reference including the cardinal directions, north, south, east, and west. Similar measurements may be provided to a navigation application program that includes a compass component. Other uses of measurements obtained by the magnetometer 1128 are contemplated.

The ambient light sensor 1130 is configured to measure ambient light. In some configurations, the ambient light sensor 1130 provides measurements to an application program stored within one the memory components 1104 in order to automatically adjust the brightness of a display (described below) to compensate for low-light and high-light environments. Other uses of measurements obtained by the ambient light sensor 1130 are contemplated.

The proximity sensor 1132 is configured to detect the presence of an object or thing in proximity to the computing device without direct contact. In some configurations, the proximity sensor 1132 detects the presence of a user's body (e.g., the user's face) and provides this information to an application program stored within one of the memory components 1104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 1132 are contemplated.

The accelerometer 1134 is configured to measure proper acceleration. In some configurations, output from the accelerometer 1134 is used by an application program as an input mechanism to control some functionality of the application program. For example, the application program may be a video game in which a character, a portion thereof, or an object is moved or otherwise manipulated in response to input received via the accelerometer 1134. In some configurations, output from the accelerometer 1134 is provided to an application program for use in switching between landscape and portrait modes, calculating coordinate acceleration, or detecting a fall. Other uses of the accelerometer 1134 are contemplated.

The gyroscope 1136 is configured to measure and maintain orientation. In some configurations, output from the gyroscope 1136 is used by an application program as an input mechanism to control some functionality of the application program. For example, the gyroscope 1136 can be used for accurate recognition of movement within a 3D environment of a video game application or some other application. In some configurations, an application program utilizes output from the gyroscope 1136 and the accelerometer 1134 to enhance control of some functionality of the application program. Other uses of the gyroscope 1136 are contemplated.

The GPS sensor 1138 is configured to receive signals from GPS satellites for use in calculating a location. The location calculated by the GPS sensor 1138 may be used by any application program that requires or benefits from location information. For example, the location calculated by the GPS sensor 1138 may be used with a navigation application program to provide directions from the location to a destination or directions from the destination to the location. Moreover, the GPS sensor 1138 may be used to provide location information to an external location-based service, such as E911 service. The GPS sensor 1138 may obtain location information generated via WI-FI, WIMAX, and/or cellular triangulation techniques utilizing one or more of the network connectivity components 1106 to aid the GPS sensor 1138 in obtaining a location fix. The GPS sensor 1138 may also be used in Assisted GPS ("A-GPS") systems. The GPS sensor 1138 can also operate in conjunction with other components, such as the processor 1102, to generate positioning data for the computing device 1100.

The I/O components 1110 include a display 1140, a touchscreen 1142, a data I/O interface component ("data I/O") 1144, an audio I/O interface component ("audio I/O") 1146, a video I/O interface component ("video I/O") 1148, and a camera 1150. In some configurations, the display 1140 and the touchscreen 1142 are combined. In some configurations two or more of the data I/O component 1144, the audio I/O component 1146, and the video I/O component 1148 are combined. The I/O components 1110 may include discrete processors configured to support the various interfaces described below, or may include processing functionality built-in to the processor 1102.

In some configurations, the computing device 1100 can include feedback device 1151, such as an actuator or solid-state circuit configured to physically vibrate in response to a haptic signal. The processing units can cause the generation of a haptic signal associated with a generated haptic effect to feedback device 1151, which in turn outputs haptic effects such as vibrotactile haptic effects, electrostatic friction haptic effects, or deformation haptic effects.

The feedback device 1151 includes a drive circuit. The feedback device 1151 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, computing device 1100 can include one or more feedback devices 1151.

The feedback device 1151 is an example of a haptic output device, where a haptic output device is a device configured to output haptic effects, such as vibrotactile haptic effects, electrostatic friction haptic effects, or deformation haptic effects, in response to a drive signal. In alternate embodiments, the feedback device 1151 can be replaced by some other type of haptic output device. Further, in other alternate embodiments, computing device 1100 may not include an actuator, and a separate device from the computing device 1100 includes an actuator, or other haptic output device, that generates the haptic effects, and computing device 1100 sends generated haptic signals to that device through a communication device.

The display 1140 is an output device configured to present information in a visual form. In particular, the display 1140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1140 is a liquid crystal display ("LCD") utilizing any active or passive matrix technology and any backlighting technology (if used). In some configurations, the display 1140 is an organic light emitting diode ("OLED") display. Other display types are contemplated.

The touchscreen 1142, also referred to herein as a "touch-enabled screen," is an input device configured to detect the presence and location of a touch. The touchscreen 1142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

In some configurations, the touchscreen 1142 is incorporated on top of the display 1140 as a transparent layer to enable a user to use one or more touches to interact with objects or other information presented on the display 1140. In other configurations, the touchscreen 1142 is a touch pad incorporated on a surface of the computing device that does not include the display 1140. For example, the computing device may have a touchscreen incorporated on top of the display 1140 and a touch pad on a surface opposite the display 1140.

In some configurations, the touchscreen 1142 is a single-touch touchscreen. In other configurations, the touchscreen 1142 is a multi-touch touchscreen. In some configurations, the touchscreen 1142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1142. As such, a developer may create gestures that are specific to a particular application program.

In some configurations, the touchscreen 1142 supports a tap gesture in which a user taps the touchscreen 1142 once on an item presented on the display 1140. The tap gesture may be used for various reasons including, but not limited to, opening or launching whatever the user taps. In some configurations, the touchscreen 1142 supports a double tap gesture in which a user taps the touchscreen 1142 twice on an item presented on the display 1140. The double tap gesture may be used for various reasons including, but not limited to, zooming in or zooming out in stages. In some configurations, the touchscreen 1142 supports a tap and hold gesture in which a user taps the touchscreen 1142 and maintains contact for at least a pre-defined time. The tap and hold gesture may be used for various reasons including, but not limited to, opening a context-specific menu.

In some configurations, the touchscreen 1142 supports a pan gesture in which a user places a finger on the touchscreen 1142 and maintains contact with the touchscreen 1142 while moving the finger on the touchscreen 1142. The pan gesture may be used for various reasons including, but not limited to, moving through screens, images, or menus at a controlled rate. Multiple finger pan gestures are also contemplated. In some configurations, the touchscreen 1142 supports a flick gesture in which a user swipes a finger in the direction the user wants the screen to move. The flick gesture may be used for various reasons including, but not limited to, scrolling horizontally or vertically through menus or pages. In some configurations, the touchscreen 1142 supports a pinch and stretch gesture in which a user makes a pinching motion with two fingers (e.g., thumb and forefinger) on the touchscreen 1142 or moves the two fingers apart.

The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1142. As such, the above gestures should be understood as being illustrative and should not be construed as being limiting in any way.

The data I/O interface component 1144 is configured to facilitate input of data to the computing device and output of data from the computing device. In some configurations, the data I/O interface component 1144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1146 is configured to provide audio input and/or output capabilities to the computing device. In some configurations, the audio I/O interface component 1146 includes a microphone configured to collect audio signals. In some configurations, the audio I/O interface component 1146 includes a headphone jack configured to provide connectivity for headphones or other external speakers. In some configurations, the audio I/O interface component 1146 includes a speaker for the output of audio signals. In some configurations, the audio I/O interface component 1146 includes an optical audio cable out.

The video I/O interface component 1148 is configured to provide video input and/or output capabilities to the computing device. In some configurations, the video I/O interface component 1148 includes a video connector configured to receive video as input from another device (e.g., a video media player such as a DVD or BLURAY player) or send video as output to another device (e.g., a monitor, a television, or some other external display). In some configurations, the video I/O interface component 1148 includes a High-Definition Multimedia Interface ("HDMI"), mini-HDMI, micro-HDMI, DisplayPort, or proprietary connector to input/output video content. In some configurations, the video I/O interface component 1148 or portions thereof is combined with the audio I/O interface component 1146 or portions thereof.

The camera 1150 can be configured to capture still images and/or video. The camera 1150 may utilize a charge coupled device ("CCD") or a complementary metal oxide semiconductor ("CMOS") image sensor to capture images. In some configurations, the camera 1150 includes a flash to aid in taking pictures in low-light environments. Settings for the camera 1150 may be implemented as hardware or software buttons.

Although not illustrated on FIG. 11, one or more hardware buttons may also be included in the computing device architecture 1100. The hardware buttons may be used for controlling some operational aspect of the computing device. The hardware buttons may be dedicated buttons or multi-use buttons. The hardware buttons may be mechanical or sensor-based.

The illustrated power components 1112 include one or more batteries 1152, which can be connected to a battery gauge 1154. The batteries 1152 may be rechargeable or disposable. Rechargeable battery types include, but are not limited to, lithium polymer, lithium ion, nickel cadmium, and nickel metal hydride. Each of the batteries 1152 may be made of one or more cells.

The battery gauge 1154 can be configured to measure battery parameters such as current, voltage, and temperature. In some configurations, the battery gauge 1154 is configured to measure the effect of a battery's discharge rate, temperature, age and other factors to predict remaining life within a certain percentage of error. In some configurations, the battery gauge 1154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1112 may also include a power connector, which may be combined with one or more of the aforementioned I/O components 1110. The power components 1112 may interface with an external power system or charging equipment via an I/O component.

Example Clauses

The disclosure presented herein encompasses the subject matter set forth in the following clauses.

Clause 1: An apparatus, comprising: a processor comprising at least one data output and a chip select (CS) output; a first flash component and a second flash component each comprising a CS input, the first flash component and the second flash component coupled to the at least one data output; and a filter device comprising a CS input and first and second CS outputs, the CS input coupled to the CS output of the processor, the first CS output coupled to the CS input of the first flash memory component and the second CS output coupled to the CS input of the second flash memory component, wherein the filter is configured to monitor instructions for communicating data between the processor and the first flash component and the second flash component, wherein the filter is configured to activate or deactivate the CS output based on the instruction, wherein the CS is activated or deactivated prior to a completion of the instruction execution.

Clause 2: The apparatus of Clause 1, wherein the filter device comprises at least one data input coupled to the at least one data output, the processor to provide an instruction on the at least one data output, the filter device to analyze the instruction via the at least one data input, and interrupt a signal on the first CS output or the second CS output in response to the analysis of the instruction.

Clause 3: The apparatus of Clauses 1 and 2, wherein the instruction comprises at least a command and an address, the filter device to analyze at least one of the command and the address and interrupt the signal on the first CS output or the second CS output when the analysis of at least one of the command and the address indicates that at least one of the command and the address is invalid or poses a security threat to at least one of the processor, the first flash memory component and second flash memory component.

Clause 4: The apparatus of Clauses 1 through 3, wherein the signal on the first CS output or the second CS output is at a logic level low prior to the analysis of the instruction, the filter device to interrupt the signal on the first CS output or the second CS output by causing the signal to transition to a logic level high in response to the analysis of the instruction.

Clause 5: The apparatus of Clauses 1 through 4, wherein the instruction comprises at least an address having an associated plurality of bits representing an address location, the filter device to analyze the associated plurality of bits and interrupt the signal on the first CS output or the second CS output when the analysis of the associated plurality of bits indicates that the address is improper or poses a security threat to at least one of the processor, the first flash memory component and second flash memory component, the filter device to interrupt the signal before a final bit of the plurality of bits is communicated to the first flash memory component or second flash memory component.

Clause 6: The apparatus of Clauses 1 through 5, wherein the at least one data output and the CS output are associated with a serial peripheral interface (SPI) linked to the processor.

Clause 7. An apparatus, comprising a processor; a memory component coupled to the processor; a serial peripheral interface (SPI) coupling the processor and the memory component, the SPI providing at least a chip select (CS) line and at least one data line; and a filter device coupled to the CS line and the at least one data line, the filter device to: analyze an instruction on the at least one data line, and interrupt a signal on the CS line in response to the analysis of the instruction on the at least one data line.

Clause 8. The apparatus according to Clause 7, wherein the instruction comprises at least a command and an address, the filter device to analyze at least one of the command and the address and interrupt the signal when the analysis of at least one of the command and the address indicates that at least one of the command and the address is invalid or poses a security threat to at least one of the processor and the memory component.

Clause 9. The apparatus according to Clauses 7 and 8, wherein the signal is at a logic level low prior to the analysis of the instruction, the filter device to interrupt the signal by causing the signal to transition to a logic level high in response to the analysis of the instruction.

Clause 10. The apparatus according to Clauses 7 through 9, wherein the instruction comprises at least an address having an associated plurality of bits representing an address location of the memory component, the filter device to analyze the associated plurality of bits and interrupt the signal when the analysis of the associated plurality of bits indicates that the address is improper or poses a security threat to at least one of the processor and the memory component, the filter device to interrupt the signal before a final bit of the plurality of bits is communicated to the memory component.

Clause 11. The apparatus according to Clause 10, wherein interrupting the signal causes formation of a corrupt instruction on the at least one data line, the memory component functional to ignore or discard corrupt instructions received thereby.

Clause 12. The apparatus according to Clauses 7 through 11, wherein the memory component is a flash memory comprising at least a portion of memory reserved for read only access, the instruction comprising a write command and an address associated with at least a portion of the memory reserved for read only access, the analysis of the instruction causing the filter device to: detect that the write command is linked to the address, and interrupt the signal, in response to detecting that the write command is linked to the address.

Clause 13. The apparatus according to Clauses 7 through 12, wherein the memory component is a flash memory comprising at least a portion of memory reserved for read only access, the instruction comprising an address associated with at least a portion of the memory reserved for read only access and data to be written to at least a portion of the memory reserved for read only access, the analysis of the instruction causing the filter device to: determine that the data is to be written to at least a portion of the memory reserved for read only access, and interrupt the signal in response to determining that the data is to be written to at least a portion of the memory reserved for read only access.

Clause 14. The apparatus according to Clauses 7 through 13, wherein the filter device coupled to the CS line and a plurality of data lines, and the instruction is on one or more of the plurality of data lines, the filter device to analyze the instruction and interrupt the signal in response to the analysis of the instruction.

Clause 15. An apparatus, comprising a master component; a slave component coupled to the master component; an interface coupling the master component and the slave component, the interface providing at least a slave select (SS) line and at least one data line, the SS line including a signal generated by the master component to select the slave component, and the at least one data line including an instruction for communication to the slave component; and a processor device coupled to the SS line and the at least one data line, the processor device to: analyze the instruction, and interrupt the signal on the SS line in response to the analysis of the instruction.

Clause 16. The apparatus according to Clause 15, wherein the master component is a processor, the slave component is a flash memory and the interface is a serial peripheral interface (SPI).

Clause 17. The apparatus according to Clauses 15 through 16, wherein the instruction comprises at least a command and an address, the processor device to analyze at least one of the command and the address and interrupt the signal when the analysis of at least one of the command and the address indicates that at least one of the command and the address is invalid or poses a security threat to at least one of the master component and the slave component.

Clause 18. The apparatus according to 9 Clauses 15 through 17, wherein the signal is at a logic level low prior to the analysis of the instruction on the at least one data line, the filter device to interrupt the signal by causing the signal to transition to a logic level high in response to the analysis of the instruction.

Clause 19. The apparatus according to Clauses 15 through 18, wherein the instruction comprises at least an address having an associated plurality of bits representing an address location of the slave component, the processor device to analyze the associated plurality of bits and interrupt the signal when the analysis of the associated plurality of bits indicates that the address is improper or poses a security threat to at least one of the master component and the slave component, the processor device to interrupt the signal before a final bit of the plurality of bits is communicated to the slave component.

Clause 20. The apparatus according to Clause 19, wherein interrupting the signal causes formation of a corrupt instruction on the at least one data line, the slave component functional to ignore or discard corrupt instructions received thereby.

Clause 21. An apparatus, comprising: a processor comprising at least one data output and a chip select (CS) output; a first flash memory component and a second flash memory component, each of the first flash memory component and the second flash memory component comprising a CS input, the first and second flash memory components coupled to the at least one data output; and a filter device comprising a CS input and first and second CS outputs, the CS input coupled to the CS output of the processor, the first CS output coupled to the CS input of the first flash memory component and the second CS output coupled to the CS input of the second flash memory component.

Clause 22. The apparatus according to Clause 21, wherein the filter device comprises at least one data input coupled to the at least one data output, the processor to provide an instruction on the at least one data output, the filter device to analyze the instruction via the at least one data input, and interrupt a signal on the first CS output or the second CS output in response to the analysis of the instruction.

Clause 23. The apparatus according to Clause 22, wherein the instruction comprises at least a command and an address, the filter device to analyze at least one of the command and the address and interrupt the signal on the first CS output or the second CS output when the analysis of at least one of the command and the address indicates that at least one of the command and the address is invalid or poses a security threat to at least one of the processor, the first flash memory component and second flash memory component.

Clause 24. The apparatus according to Clauses 22 and 23, wherein the signal on the first CS output or the second CS output is at a logic level low prior to the analysis of the instruction, the filter device to interrupt the signal on the first CS output or the second CS output by causing the signal to transition to a logic level high in response to the analysis of the instruction.

Clause 25. The apparatus according to Clauses 22 through 24, wherein the instruction comprises at least an address having an associated plurality of bits representing an address location, the filter device to analyze the associated plurality of bits and interrupt the signal on the first CS output or the second CS output when the analysis of the associated plurality of bits indicates that the address is improper or poses a security threat to at least one of the processor, the first flash memory component and second flash memory component, the filter device to interrupt the signal before a final bit of the plurality of bits is communicated to the first flash memory component or second flash memory component.

Clause 26. The apparatus according to Clauses 22 through 25, wherein the at least one data output and the CS output are associated with a serial peripheral interface (SPI) linked to the processor.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to provide security enhanced data reads and writes associated with a processing device and a memory device. To address at least this technical need, the implementations described herein provide a filter device that is disposed between the processing device in the memory device. The filter device is functional to analyze reads and writes that are associated with the processing device in the memory device. The filter device may intercept reads and writes that may pose a security threat to the processing device and/or the memory device. At least one benefit of providing a filter device that analyzes reads and writes that are associated with processing devices and memory devices is the enhanced data security that is achieved by way of such analysis. Other technical benefits not specifically identified herein can also be realized through implementations of the disclosed technologies.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. An apparatus, comprising:
    a processor;
    a memory component coupled to the processor, the memory component configured to ignore or discard corrupt instructions;
    a serial peripheral interface (SPI) coupling the processor and the memory component, the SPI providing at least a chip select (CS) line and at least one data line; and
    a filter device coupled to the CS line and the at least one data line, the filter device to:
        analyze an instruction on the at least one data line, the instruction to be received by the memory component, and
        interrupt a signal on the CS line based upon the analysis of the instruction on the at least one data line, whereby interruption of the signal on the CS line causes the instruction to be corrupted.

2. The apparatus according to claim 1, wherein the instruction comprises at least a command and an address, the filter device to analyze at least one of the command and the address and interrupt the signal when the analysis of at least one of the command and the address indicates that at least one of the command and the address poses a security threat to at least one of the processor and the memory component.

3. The apparatus according to claim 1, wherein the signal is at a logic level low prior to the analysis of the instruction, the filter device to interrupt the signal by causing the signal to transition to a logic level high in response to the analysis of the instruction.

4. The apparatus according to claim 1, wherein the instruction comprises at least an address having an associated plurality of bits representing an address location of the memory component, the filter device to analyze the associated plurality of bits and interrupt the signal when the analysis of the associated plurality of bits indicates that the address is improper or poses a security threat to at least one of the processor and the memory component, the filter device to interrupt the signal before a final bit of the plurality of bits is communicated to the memory component.

5. The apparatus according to claim 1, wherein the memory component is a flash memory comprising at least a portion of memory reserved for read only access, the instruction comprising a write command and an address associated with at least a portion of the memory reserved for read only access, the analysis of the instruction causing the filter device to:
    detect that the write command is linked to the address, and
    interrupt the signal, in response to detecting that the write command is linked to the address.

6. The apparatus according to claim 1, wherein the memory component is a flash memory comprising at least a portion of memory reserved for read only access, the instruction comprising an address associated with at least a portion of the memory reserved for read only access and data to be written to at least a portion of the memory reserved for read only access, the analysis of the instruction causing the filter device to:
    determine that the data is to be written to at least a portion of the memory reserved for read only access, and
    interrupt the signal in response to determining that the data is to be written to at least a portion of the memory reserved for read only access.

7. The apparatus according to claim 1, wherein the filter device coupled to the CS line and a plurality of data lines, and the instruction is on one or more of the plurality of data lines, the filter device to analyze the instruction and interrupt the signal in response to the analysis of the instruction.

8. The apparatus of claim 1, wherein the memory component ignores or discards the corrupt instruction in response to receiving the corrupt instruction.

9. An apparatus, comprising:
    a master component;
    a slave component coupled to the master component, the slave component comprising a memory device, the memory device configured to ignore or discard corrupt instructions;
    an interface coupling the master component and the slave component, the interface providing at least a slave select (SS) line and at least one data line, the SS line including a signal generated by the master component to select the slave component, and the at least one data line including an instruction for communication to the slave component; and
    a processor device coupled to the SS line and the at least one data line, the processor device to:
        analyze the instruction, and
        interrupt the signal on the SS line based upon the analysis of the instruction, whereby interruption of the signal on the CS line causes the instruction to be corrupted.

10. The apparatus according to claim 9, wherein the master component is a processor, the slave component is a flash memory and the interface is a serial peripheral interface (SPI).

11. The apparatus according to claim 9, wherein the instruction comprises at least a command and an address, the processor device to analyze at least one of the command and the address and interrupt the signal when the analysis of at least one of the command and the address indicates that at least one of the command and the address poses a security threat to at least one of the master component and the slave component.

12. The apparatus according to claim 9, wherein the signal is at a logic level low prior to the analysis of the instruction on the at least one data line, the filter device to interrupt the signal by causing the signal to transition to a logic level high in response to the analysis of the instruction.

13. The apparatus according to claim 9, wherein the instruction comprises at least an address having an associated plurality of bits representing an address location of the slave component, the processor device to analyze the associated plurality of bits and interrupt the signal when the analysis of the associated plurality of bits indicates that the address is improper or poses a security threat to at least one of the master component and the slave component, the processor device to interrupt the signal before a final bit of the plurality of bits is communicated to the slave component.

14. An apparatus, comprising:
a processor comprising at least one data output and a chip select (CS) output;
a first flash memory component and a second flash memory component, each of the first flash memory component and the second flash memory component comprising a CS input, the first and second flash memory components coupled to the at least one data output, the memory components configured to ignore or discard corrupt instructions; and
a filter device comprising a CS input and first and second CS outputs, the CS input coupled to the CS output of the processor, the first CS output coupled to the CS input of the first flash memory component and the second CS output coupled to the CS input of the second flash memory component, the filter device functional to interrupt a signal on the first CS output or the second CS output, whereby interruption of the signal on the CS line causes the instruction to be corrupted.

15. The apparatus according to claim 14, wherein the filter device comprises at least one data input coupled to the at least one data output, the processor to provide an instruction on the at least one data output, the filter device to
analyze the instruction via the at least one data input, and
interrupt the signal on the first CS output or the second CS output in response to the analysis of the instruction.

16. The apparatus according to claim 15, wherein the instruction comprises at least a command and an address, the filter device to analyze at least one of the command and the address and interrupt the signal on the first CS output or the second CS output when the analysis of at least one of the command and the address indicates that at least one of the command and the address poses a security threat to at least one of the processor, the first flash memory component and second flash memory component.

17. The apparatus according to claim 15, wherein the signal on the first CS output or the second CS output is at a logic level low prior to the analysis of the instruction, the filter device to interrupt the signal on the first CS output or the second CS output by causing the signal to transition to a logic level high in response to the analysis of the instruction.

18. The apparatus according to claim 15, wherein the instruction comprises at least an address having an associated plurality of bits representing an address location, the filter device to analyze the associated plurality of bits and interrupt the signal on the first CS output or the second CS output when the analysis of the associated plurality of bits indicates that the address is improper or poses a security threat to at least one of the processor, the first flash memory component and second flash memory component, the filter device to interrupt the signal before a final bit of the plurality of bits is communicated to the first flash memory component or second flash memory component.

19. The apparatus according to claim 15, wherein the at least one data output and the CS output are associated with a serial peripheral interface (SPI) linked to the processor.

* * * * *